United States Patent [19]
Lund

[11] 3,844,328
[45] Oct. 29, 1974

[54] TIRE CHANGER FOR SPOKED WHEELS

[76] Inventor: Walter L. Lund, 10207 Adoree, Downey, Calif.

[22] Filed: Sept. 7, 1972

[21] Appl. No.: 286,863

[52] U.S. Cl............................. 157/1.24, 157/1.26
[51] Int. Cl............................................ B60c 25/06
[58] Field of Search........... 157/1.1, 1.17, 1.2, 1.22, 157/1.24, 1.26, 1.28; 144/288 A

[56] References Cited
UNITED STATES PATENTS
2,783,830   3/1957   Pozeryzki et al. ................. 157/1.24
3,050,096   8/1962   Lydle et al..................... 157/1.24 X FOREIGN PATENTS OR APPLICATIONS
24,630   11/1896   Great Britain..................... 157/1.24

*Primary Examiner*—Al Lawrence Smith
*Assistant Examiner*—Harold P. Smith, Jr.

[57] ABSTRACT

A tire changer for spoked wheels, such as cycle wheels, wherein a wheel and tire thereon are rotatably supported on a horizontal axis, with or without the wheel axle, there being a tire bead unseating element and a seating element each of which is selectively positioned relative to the bead at one side of the tire, with back-up means at the opposite side of the tire from the unseating and seating means, the latter two elements being held relatively stationary while the wheel and tire are rotated during the unseating and seating of the bead. The device includes a base which, with the location of the unseating and seating means below the axis of rotation of the wheel and tire permit considerable leverage to be exerted by rotating the tire, without requiring the base to be anchored against undesirable tilting action.

4 Claims, 10 Drawing Figures

PATENTED OCT 29 1974 3,844,328
SHEET 1 OF 2

TIRE CHANGER FOR SPOKED WHEELS

The invention relates to a tire changing device and more specifically to one for changing tires on spoked wheels which of course do not have the relatively large open central portions common to vehicle wheels known as disc wheels.

An object of the invention is to provide a tire changer wherein a spoked wheel and tire can be supported for rotation about a horizontal axis, there being provided tire bead unseating and seating elements which can be positioned relatively stationarily in engagement with a tire bead and the tire and wheel rotated by hand, the radius of the wheel and tire providing sufficient leverage about the axis of rotation as a fulcrum to effect simple and efficient mounting and dismounting of a tire.

Another object is to provide a device of the class described wherein the tire bead unseating and seating elements are located below the axis of rotation of the wheel which carries the tire so that a considerable amount of leverage can be exerted by rotation of the wheel without requiring that the apparatus be anchored against undesirable tilting movement.

A further object of the invention is to provide a device wherein there is a tire bead seating element which exerts lateral pressure against the bead and side wall of the tire, and wherein there is provided a back-up roller on the opposite side of the tire and rim of the wheel to encounter the lateral pressure of the seating element.

Still another object is to provide a tire changer for spoked wheels, such as those used on motorcycles, which is of relatively simple and economical construction so that it is reasonably available to motorcycle owners.

Another object is to provide a device which not only is intended for use for mounting and dismounting tires from spoked wheels but can also be used as a support for holding such a wheel while the spokes are being tightened or otherwise adjusted to "true" the wheel.

Other objects and advantages of the invention appear more fully from the following description in connection with the accompanying drawings.

Figure 1:
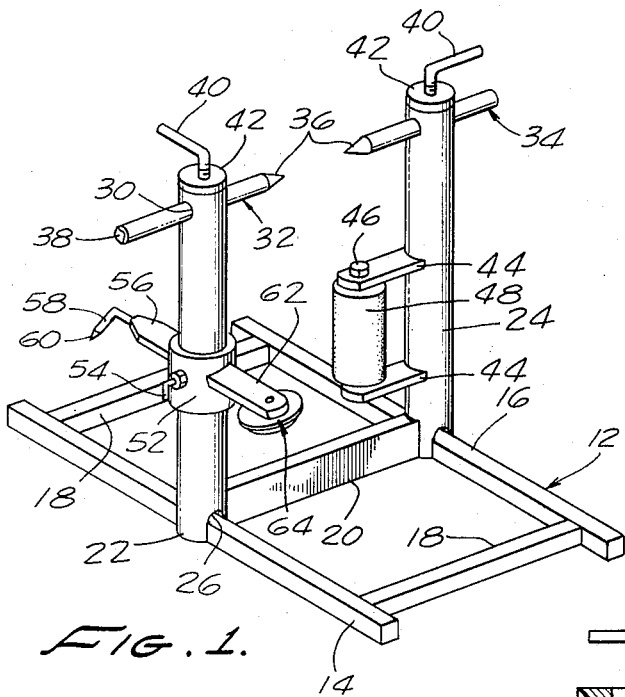
FIG. 1 is a perspective view of an embodiment of the invention.
Figure 4:
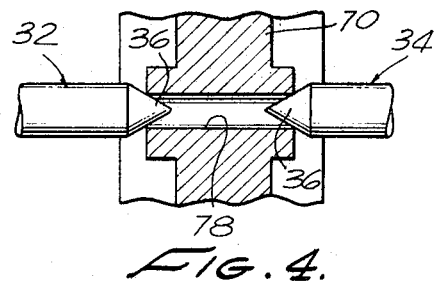
FIG. 4 is an enlarged sectional detail of a wheel hub as it is supported in the device.

The device includes a base 12 having side members 14 and 16, end cross members 18 and a central cross member 20. Secured to and extending upwardly from the side members 14 and 16 are cylindrical uprights 22 and 24. The lower end of each upright is provided with an inverted U-shaped cutout 26 to receive its respective base side member 14 or 16, the adjacent parts at this point being secured as by welds 28.

The upper end of each upright 22 and 24 is provided with horizontally aligned apertures 30 to slidably support pivot pins 32 and 34. Each of said pivot pins has a pointed end 36 and a recessed end 38. Each pin is releasably secured in its upright by means of a set screw 40 threaded through an end cap 42 preferably welded to the top of the cylindrical upright.

The upright 24 has a pair of vertically spaced brackets 44 between which is a bolt 46 supporting a roller 48 which is rotatable either relative to or with the bolt 46. A suitable bushing 50 supports the lower end of the roller 48. The outer surface of the roller preferably is covered with a rubber-like material. The upright 22 has a collar 52 vertically slidable and also rotatable thereon. A set screw 54 is threaded through the collar 52 and can be tightened against the upright 22 to releasably position the collar in any desired position.

Extending radially from the collar 52 is an arm 56 carrying an angled shank 58 preferably having a more or less pointed end 60. A second arm 62 extends radially from a collar 52 oppositely from the arm 56. The outer end of the arm 62 rotatably supports a wheel 64 having a side flange 66.

Figure 3:
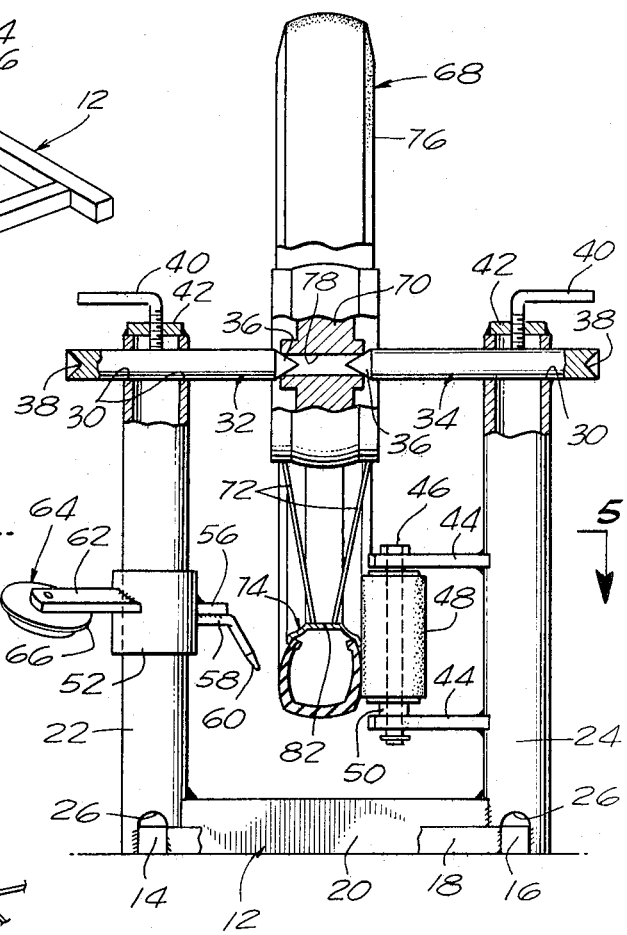
FIG. 3 is an end elevational view of the structure of FIG. 2 with a portion of the wheel and tire broken away and parts of the device in section.
Figure 2:
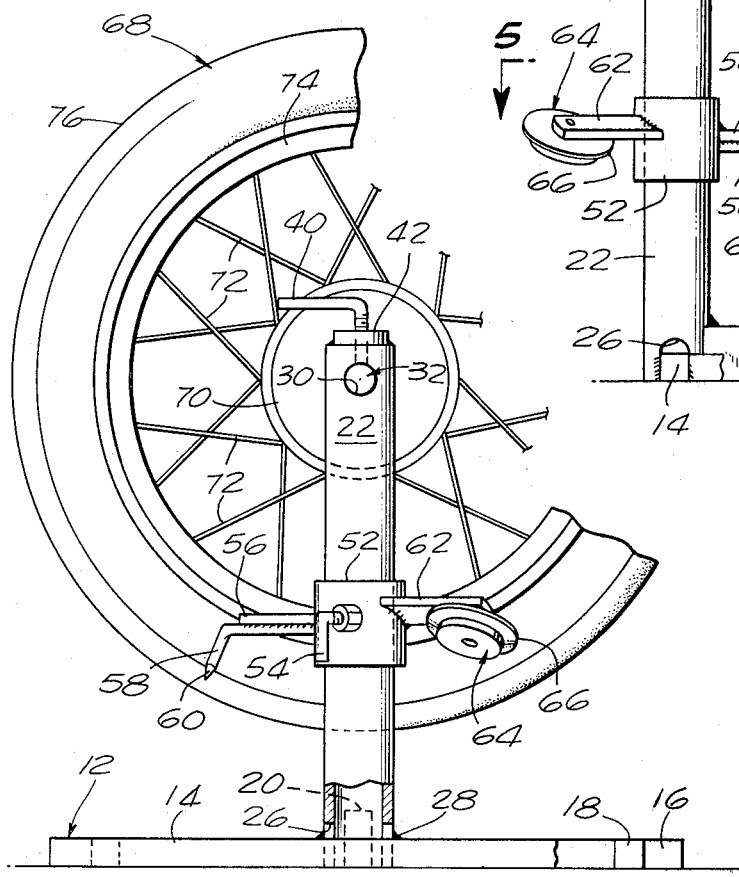
FIG. 2 is a side elevational view with a wheel and tire mounted thereon, a portion of the wheel and tire being broken away and certain details being shown in section.
Figure 5:
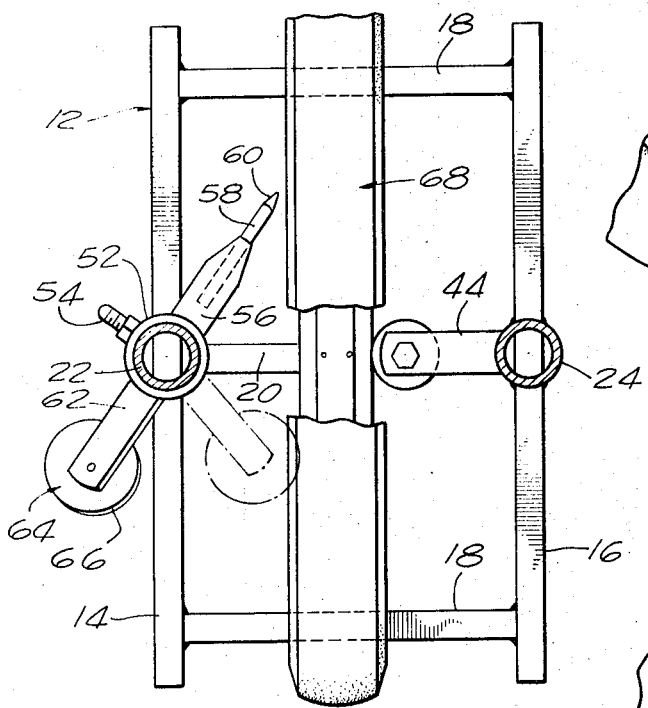
FIG. 5 is a section taken approximately on the line 5—5 of FIG. 3.

In FIG. 3 there is illustrated a wheel 68 having a hub portion indicated generally at 70. The wheel, for example, can be a motorcycle wheel having wire spokes 72, a metal rim 74 and a pneumatic tire 76. The hub 70, as is well known, is provided with bearings, such as ball bearing units, at each side of the hub and a short axle extending through the hub and the bearings and terminating a short distance at either side of the hub. In FIG. 3 the bearing detail is not shown since it is quite well known. However, there is shown an opening 78 through the hub to represent the hub with the axle removed. In such an instance the wheel 68 is supported between the pointed ends 36 of the pivot pins 32 and 34.

If it is desired to support the wheel and the apparatus without removing the axle, the pivot pins 32 and 34 can be reversed in position with the recessed ends 38 directed inwardly toward each other and with the ends of the wheel axle received in the recesses.

The wheel 68 is positioned as in FIG. 3 with the right side wheel of the tire 76 contacting the roller 48 which comprises a back-up roller. Depending upon the cross-sectional side of the tire 76, the back-up roller 48 may be contacted by the tire alone or by the side wall of the tire and the adjacent edge of the wheel rim 74.

Figure 6:
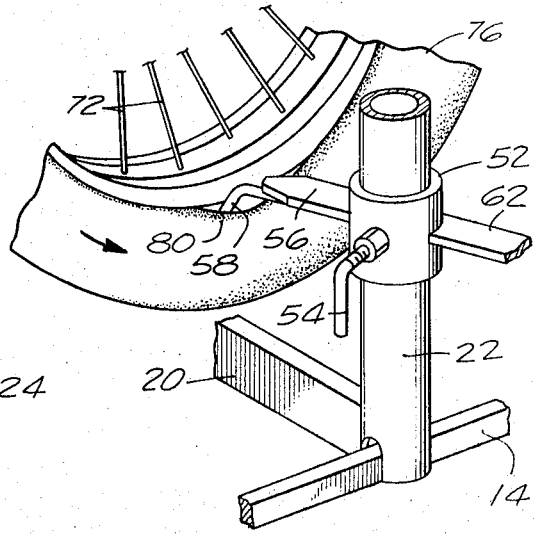
FIG. 6 is a fragmentary perspective illustrating the tire bead unseating operation.
Figure 7:
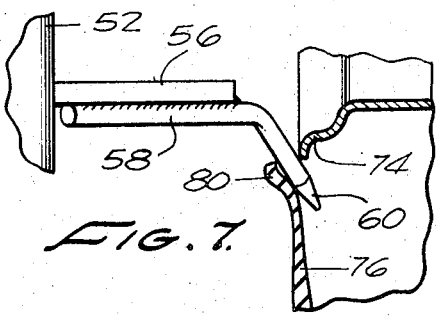
FIG. 7 is an enlarged detail of the unseating element generally in the position shown in FIG. 6 with portions of the wheel and tire casing in section.

With the wheel so positioned, the tire bead unseating element 58 is brought into play. As best shown in FIG. 7, the collar 52 which supports the element 58, is rotated so that the pointed end 60 of the unseating element 58 can be inserted between the tire bead 80 and the wheel rim 74. Then the wheel and tire are rotated by grasping the tire and pulling it around in the direction indicated in FIG. 6. The location and angularity of the unseating element 58 will pull the tire bead 80 from behind the edge of the wheel rim 74. When the wheel has been turned a full revolution, the bead at one side of the tire will be completely unseated. It is then a relatively simple matter to remove the tire casing from the rim by hand.

Figure 8:
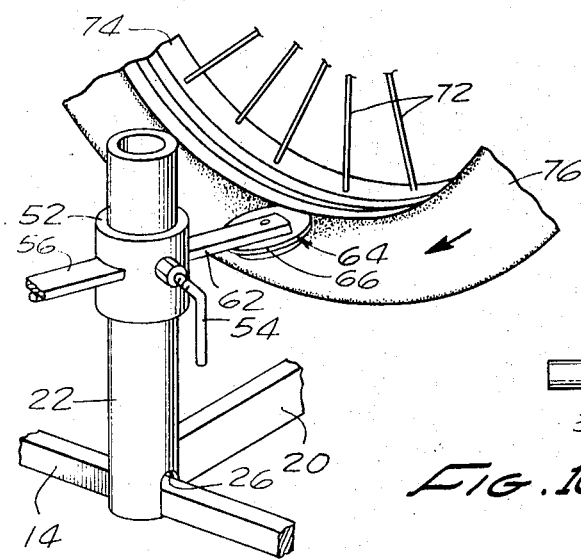
FIG. 8 is a view similar to FIG. 6 illustrating the tire bead seating operation.
Figure 9:
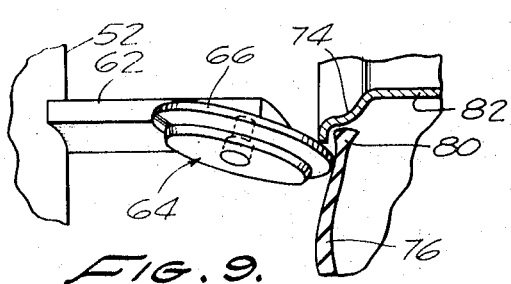
FIG. 9 is a view similar to FIG. 7 further illustrating the tire bead seating operation.

When the tire is to be mounted upon the wheel rim 74, the bead at one side of the tire and casing is worked into the drop center portion 82 of the rim 74 and the other bead can then be seated on the rim in the manner indicated in FIGS. 8 and 9. The seating wheel 64 is placed against the tire with the wheel flange 66 lying against the edge of the wheel rim 74, said wheel 64 being held in position by tightening of the set screw 54 to hold the collar 52 in position to exert pressure laterally inwardly against the tire. The wheel 68 is then rotated in the direction indicated by the arrow in FIG. 8 and the wheel will force the bead 80 behind the edge of the rim in the manner illustrated in FIG. 9.

In order to prevent undue lateral pressure against the wheel when the tire is being mounted, the tire and wheel are located laterally as shown in FIG. 3, with one side wall of the tire and possibly a portion of the wheel rim, bearing against the roller 48. This position of the wheel and tire can be utilized in unseating the tire bead but lateral pressure is not an important factor in that operation.

Figure 10:
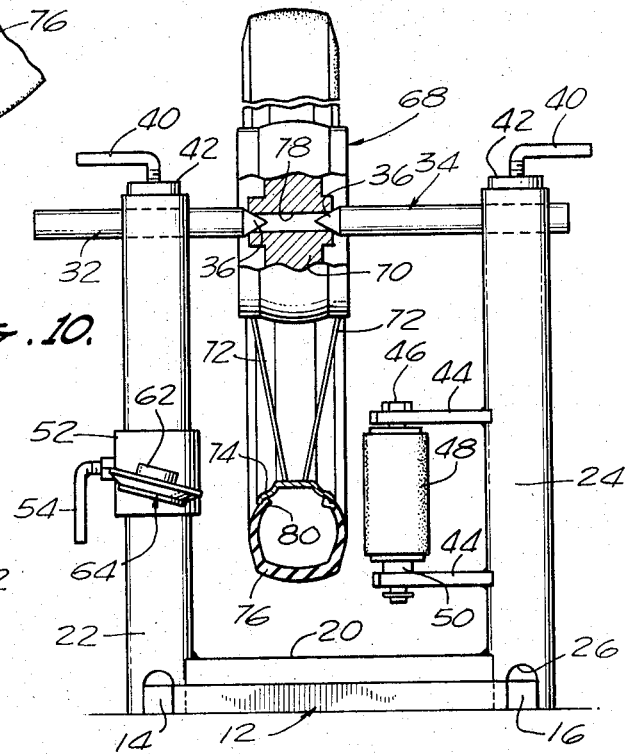
FIG. 10 is an end view of the device showing a wheel and tire partially in section, in position for adjusting the spokes and truing the wheel.

In FIG. 10 the wheel 6 is shown mounted for rotation in a position spaced to the left from roller 48 and the sleeve 52 which carries the bead seating wheel 64 and unseating element 58 can be turned so that neither the wheel nor the unseating element is in contact with the tire or wheel. This leaves the wheel 68 free for rotation. When so supported, the wheel is conveniently held to permit adjusting of the spokes 72 in the customary manner, not only to tighten them but to true the wheel, and more specifically, the rim 74, if the rim is not truly straight. As the truing operation is carried out, the wheel 68 can be spun so that the operator of the apparatus can visually determine when the wheel is straight.

It should of course be understood that various changes can be made in the form, details, arrangement and proportions of the various parts without departing from the spirit of the invention.

I claim:

1. A tire changer for spoked wheels having hub assemblies, wherein the improvement comprises: elevated supporting means having laterally spaced hub assembly-engaging means for supporting a wheel between them for rotation about a horizontal axis, a tire bead unseating element, a tire bead seating element, said unseating and seating elements being carried by the elevated supporting means and selectively movable from positions permitting free rotation of the wheel to positions for engaging the bead of a tire, said elevated supporting means comprising a base and a pair of spaced uprights extending upwardly therefrom, pivot pins carried one each by each of said pair of uprights and having a common horizontal axis, at least one of the pivot pins being mounted for adjustment toward and away from the other, and each pivot pin having a recessed wheel axle receiving end portion and being reversible end to end on its respective upright.

2. A tire changer for spoked wheels having hub assemblies, wherein the improvement comprises: a base, elevated supporting means extending upwardly from said base and having laterally spaced hub assembly-engaging means for supporting a wheel between then for rotation about a horizontal axis, a tire bead unseating element, a tire bead seating element, said unseating and seating elements being carried by the elevated supporting means and selectively movable from positions permitting free rotation of the wheel to positions for engaging the bead of a tire, said base having its greater dimensions horizontally in a direction normal to said horizontal axis to prevent tipping of the base when the wheel, used as a lever, is turned by hand with one of said seating and unseating elements in operating position, said elevated supporting means comprising a base and a pair of spaced uprights extending upwardly therefrom, a pair of spaced pivot pins carried one each by each of said pair of uprights and having a common horizontal axis, at least one of the pivot pins being adjustable toward and away from the other, each pivot pin having a recessed end portion and being reversible end-to-end on it respective upright.

3. The structure in claim 2, and said tire bead unseating and seating elements being mounted on one of said uprights and movable toward and away from a vertical plane transverse to said common horizontal axis and between the uprights, and a back-up roller on the other upright positioned to engage one of said tire and wheel in opposition to one of said tire bead unseating and seating elements.

4. The structure in claim 2, and one of said uprights being cylindrical and a collar vertically and rotatably movable on said upright, means releasably securing the collar in selected vertical and rotational positions on said upright, and said tire bead unseating and seating elements being carried by and extending from said collar at spaced points thereabout and selectively positionable in the direction of a vertical plane transverse of said horizontal axis and between said uprights.

* * * * *